June 22, 1937.　　H. M. ROBINSON　　2,084,707
BRAKE VALVE
Filed Oct. 20, 1936　　3 Sheets-Sheet 2
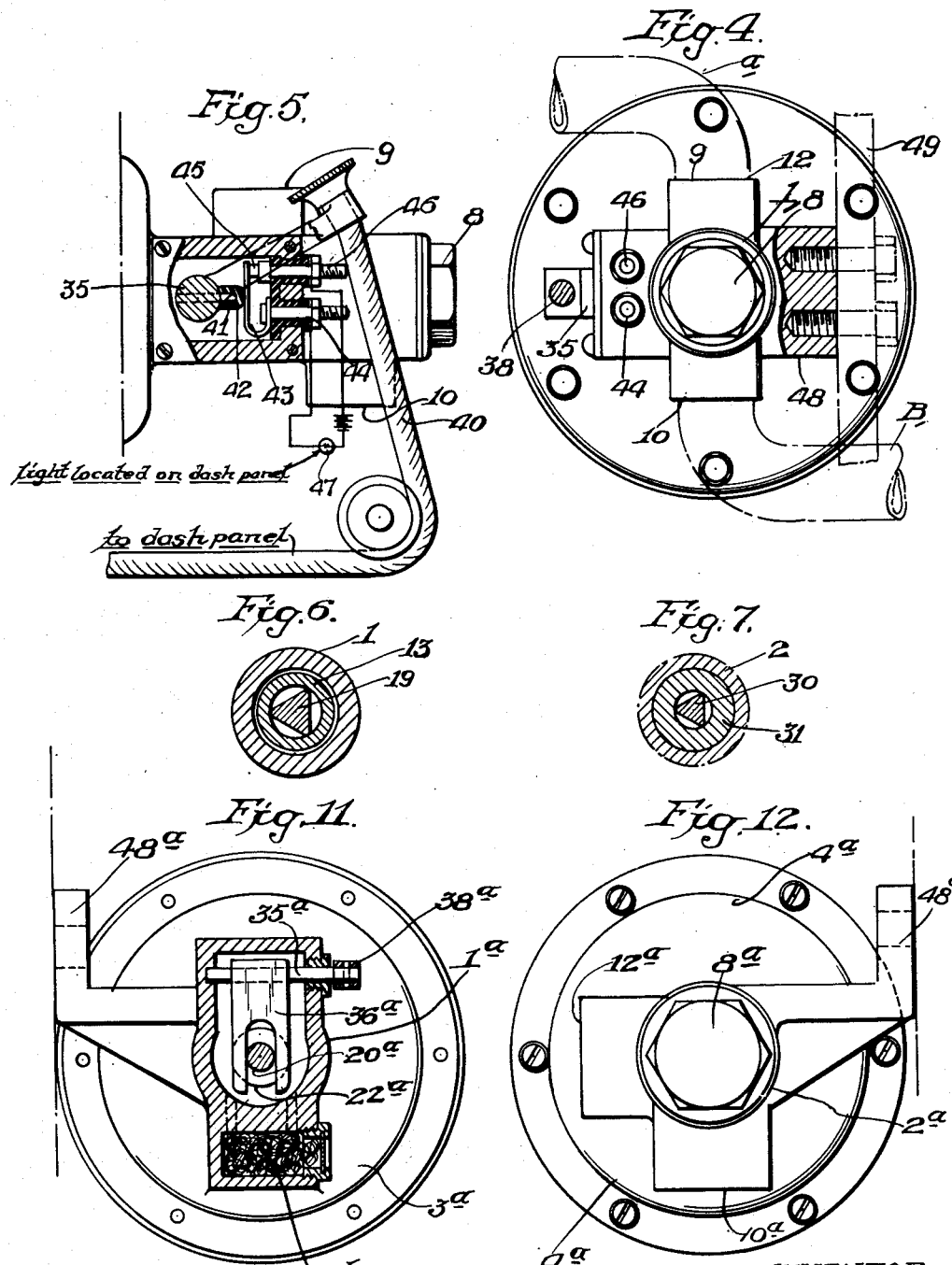

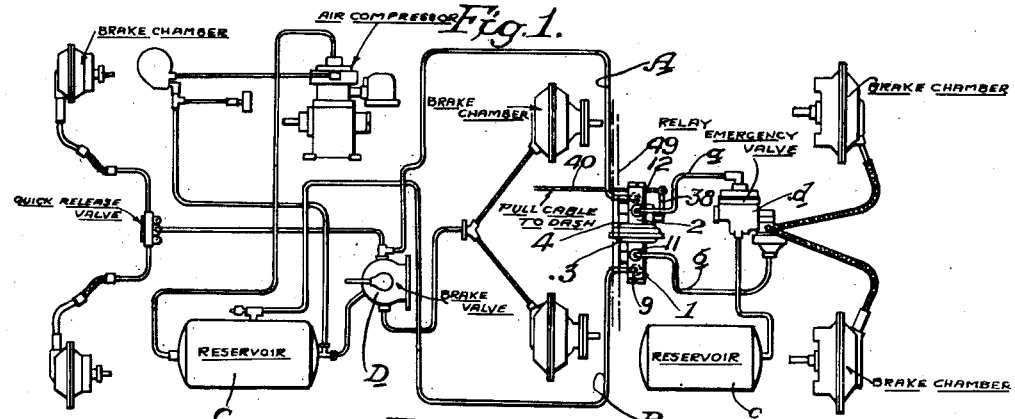
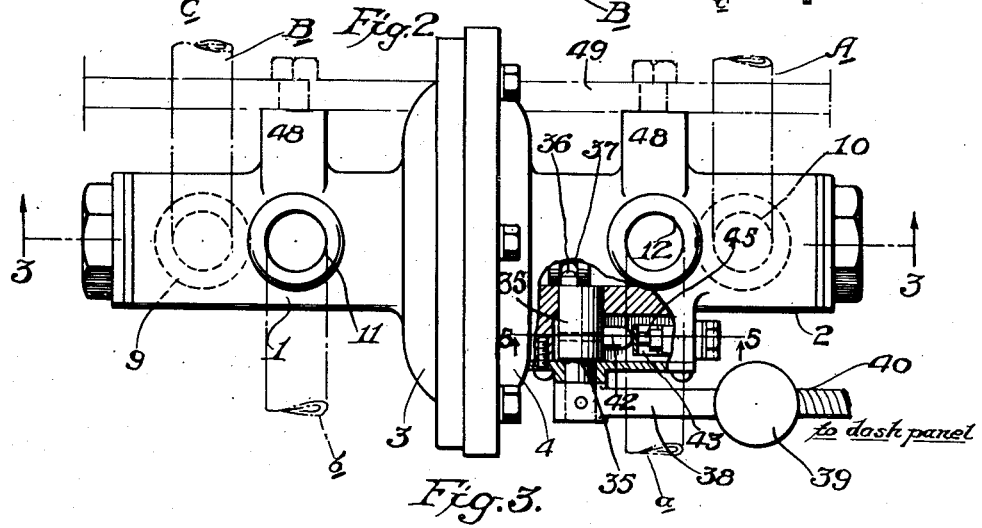
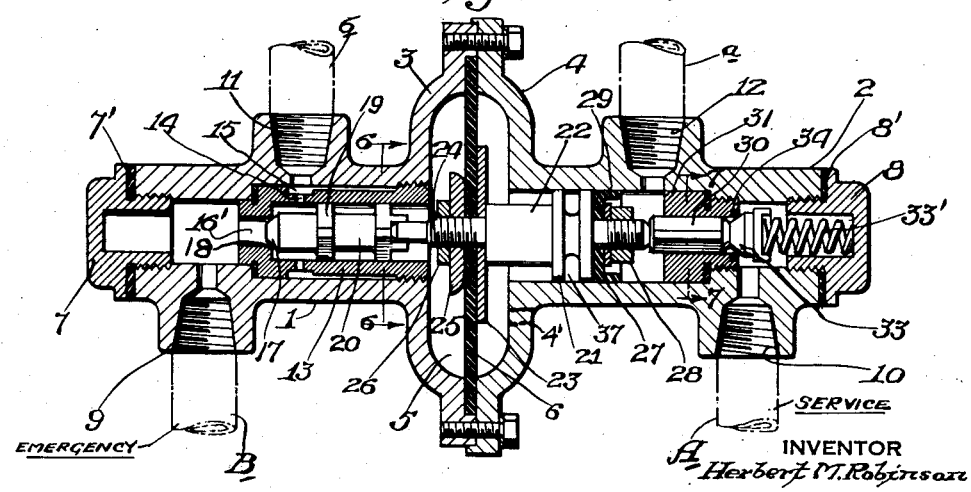

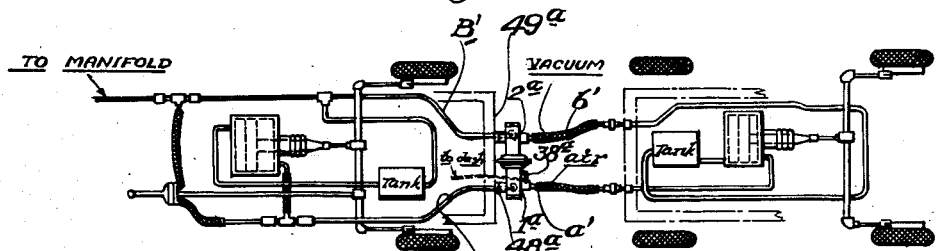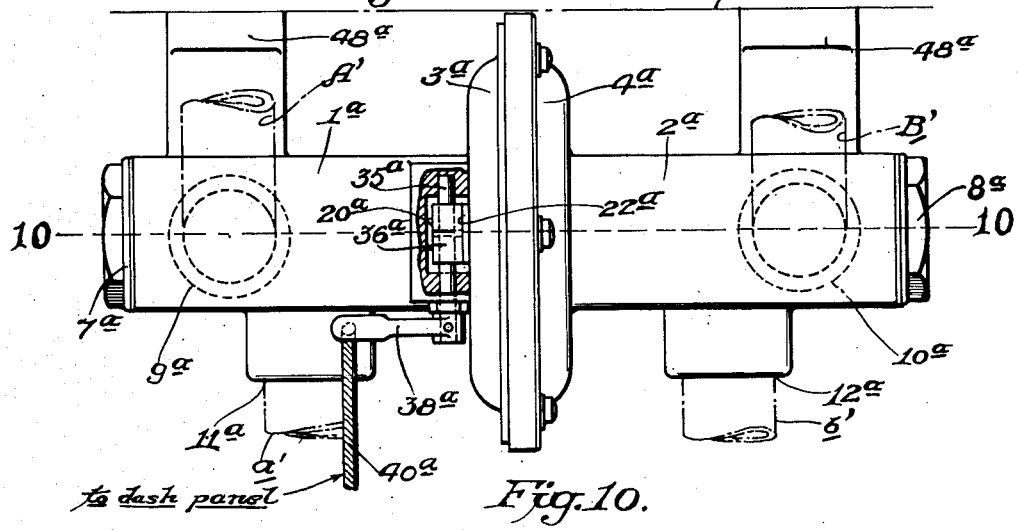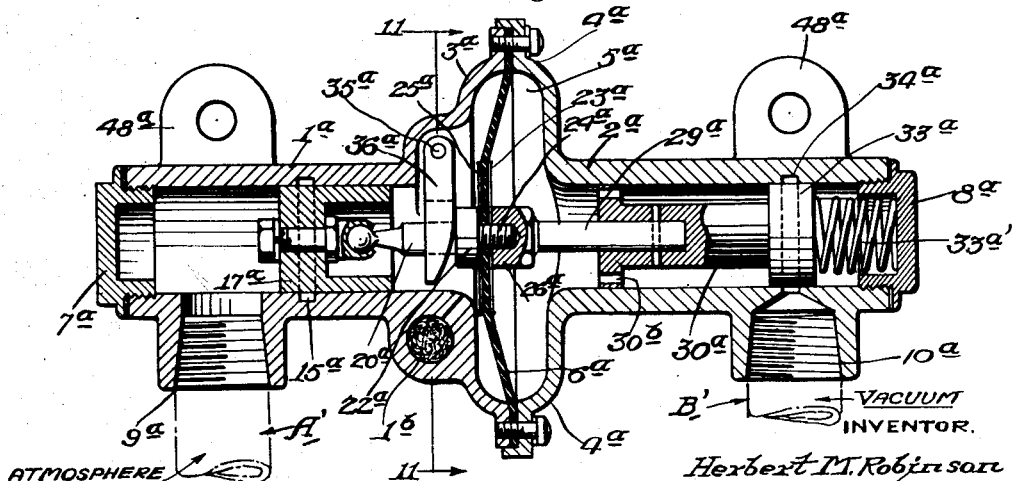

Patented June 22, 1937

2,084,707

UNITED STATES PATENT OFFICE 2,084,707

BRAKE VALVE

Herbert M. Robinson, Newark, N. J., assignor to Reliable Machine Screw Sales Co., Inc., Newark, N. J., a corporation of New Jersey Application October 20, 1936, Serial No. 106,523

12 Claims. (Cl. 303—26)

My invention is an improvement in braking systems for tractors and trailers providing valve mechanism through which the brake lines of the tractor may be readily connected with and maintained in communication with the auxiliary brake lines of a trailer and the tractor brake lines are automatically closed when the trailer lines are disconnected either intentionally or accidentally, thereby preventing stalling of the tractor engine or impairment of tractor braking.

My improvements are applicable to various types of braking systems employing two lines, in one of which pressure is substantially constant and in the other of which pressure is varied to effect the operation of the brakes. The pressure in the constant pressure line may be either above atmospheric, as in so-called "air brake" systems, or below atmospheric, as in so-called "vacuum" brake systems.

In accordance with my improvements, valve mechanism for controlling the tractor lines is biased toward position for closing such lines whenever the ends of such lines are open to atmosphere. But when the tractor and trailer lines are connected, the valve mechanism is shiftable to establish communication between such lines and to overcome the action of the biasing means by establishing differential pressures on opposite sides of a fluid-pressure-operable member connected with the valve mechanism.

In its preferred form, my invention is embodied in a casing containing chambers and provided with complementary ports through which the respective chambers may communicate with complementary tractor and trailer brake lines. A diaphragm, or other fluid-pressure-operable piston, is housed in the casing, preferably between the chambers, and has connected therewith valve mechanism, which is normally biased rectilineally by a spring into position for closing the tractor lines. The movement of the valve mechanism against the biasing action of the spring opens communication between each tractor line and its complementary trailer line and also between constant pressure tractor line and one side of the diaphragm. The valve mechanism includes a plunger of less area than the diaphragm and which impedes the communication to the diaphragm of the pressure of the variable pressure tractor line. The side of the diaphragm so protected from variable pressures is preferably constantly subjected to atmospheric pressure through an aperture in the casing between the diaphragm and the protecting plunger. Such atmospheric pressure may be either the motive fluid for holding the diaphragm when the opposite side thereof communicates with a vacuum line or may be expelled or compressed to permit movement of the diaphragm when the opposite side of the diaphragm communicates with a super-atmospheric pressure line. The valve mechanism is preferably provided with apertured radial guides through which the pressure of the constant pressure line, whether sub-atmospheric or super-atmospheric, passes to the diaphragm, and the parts of the valve mechanism are flexibly coupled so that there will be no tendency to bind and hinder the effectiveness of the biasing spring.

The characteristic features and advantages of my improvements will further appear from the following description and the accompanying drawings in illustration of typical embodiments thereof Fig. 1 illustrates diagrammatically the incorporation of my improvements in a conventional air brake system for a tractor and trailer; Fig. 2 is a part sectional top plan view of automatic air shut-off mechanism embodying my invention; Fig. 3 is a vertical, sectional view taken on the line 3—3 of Fig. 2; Fig. 4 is an end view of the right hand end of the mechanism shown in Fig. 2; Fig. 5 is a fragmentary, vertical, sectional view taken on the line 5—5 of Fig. 2; Fig. 6 is a transverse sectional view taken on the line 6—6 of Fig. 3; Fig. 7 is a transverse sectional view taken on the line 7—7 of Fig. 3; Fig. 8 illustrates diagrammatically the incorporation of a modified form of my improvements in a conventional vacuum braking system for a tractor and trailer; Fig. 9 is a part sectional top plan view of the mechanism shown in Fig. 8; Fig. 10 is a vertical sectional view taken on the line 10—10 of Fig. 9; Fig. 11 is a transverse sectional view taken on the line 11—11 of Fig. 10; and Fig. 12 is a right hand end view of the mechanism shown in Fig. 9.

In the embodiment of my invention illustrated in Figs. 1 to 7 of the drawings, a casing is formed from hollow tubular shells 1 and 2, which are provided at the inner ends thereof with flaring concave flanges 3 and 4 bolted together around their peripheries. The casing contains a central chamber 5 in which is mounted an elastic diaphragm 6 having its edge tightly clamped between the peripheral edges of the flanges 3 and 4. The ends of the tubular shells 1 and 2 are sealed by plugs 7 and 8 and gaskets 7' and 8'. Bosses on the bottoms and tops of the shells 1 and 2 are tapped to form respectively ports 9 and 10 for connecting the interiors of these shells with brake lines of a tractor brake system and to form ports 11 and 12 for connecting the interiors of the shells with the complementary auxiliary lines of a trailer brake system.

A bushing 13 is screwed into a countersunk portion of the barrel 1 and contains a series of radial ports 14 communicating with a circumferential channel 15 which communicates with the port 11. The end of the bushing contains a port 16' which communicates through the end chamber of the shell 1 with the port 9 and is controlled by a conical valve 17 coacting with a seat 18 and guided rectilinearly by the engagement of the isosceles triangular guides 19 on the valve stem 20, which guides equidistantly engage the interior surface of the bushing 13, which has a curvature whose radius is substantially equal to the distance from the center of the stem to an apex of one of the guides so that passages are left between the apexes of the guides.

A plunger 21 is slidable in the cylindrical shell of the casing 2 and has a stem 22 which bears against a washer 23 and a reduced shank 24 which passes through the washer 23, diaphragm 6, and washer 25 and is connected with the valve stem 20, the parts being held together by a nut 26 threaded on the shank 24. A flanged cup washer 27 is fixed to the head of the plunger by a nut 28 threaded on the shank 29 projecting from the piston head. The end of the shank 29 bears against and makes a flexible connection with the end of a triangular valve stem 30 which slides in a bushing 31 threaded in the countersunk portion of the barrel 2, the stem having thereon a conical valve head 33 adapted to coact with a valve seat 34, which may be provided with a suitable gasket. The end of the valve head is flanged to form a cup or recess for the reception of an end of the coiled spring 33' which is seated in an axial recess in the plug 8 and tends to bias toward the left all of the movable members housed within the casings 1 and 2.

A shaft 35 is journalled in a bearing in the wall of the shell 2 and has a pin 36 eccentrically mounted on the inner face thereof and adapted to engage a peripheral groove 37 in the plunger 21. The shaft 35 may be rocked to move the plunger 21 axially by an arm 38 fixed on the shaft 35 and provided with a finger piece 39. A cable 40 may be connected with the arm 38 and extended over suitable pulleys, not shown, to the dash-board or other convenient part of the vehicle for the remote operation of the arm 38 against the biasing action of the spring 33'.

A radial pin 41 projects from the shaft 35 and has fixed thereon an insulated button 42 adapted to engage a U-shaped spring conductor 43 which is permanently connected to a terminal 44 and is normally biased away from the contact 45 of the terminal 46. When the shaft 35 is turned anti-clockwise, the button 42 presses the spring contact into engagement with the contact 45 to close the circuit of a signal 47 which may be mounted on the dash or other convenient part of the vehicle to indicate that the connection between the braking lines of the tractor and of the trailer is cut off.

The shells 1 and 2 are provided with recessed threaded bosses 48 by which the mechanism may be mounted upon a frame member 49 of a tractor.

This embodiment of my invention is particularly applicable to tractors having an air pressure brake system including a substantially constant pressure air line B, commonly called an "emergency" line, which may be connected by a suitable coupling with the port 9, and a service air line A which may be connected through a suitable coupling with the port 10. When used in connection with the trailer, the emergency line b of the trailer braking system is connected with the port 11 through a detachable coupling, and the service air line a of the trailer braking system is connected with the port 12 through a detachable coupling.

Since the construction and operation of tractor air braking systems per se are well known and form no part of my present invention, it will be unnecessary to describe the same further than to point out that air compressed by a compressor is stored in a suitable reservoir C from which air pressure is maintained at all times in the line B for supplying air under pressure to the reservoir c of the trailer through the line b and a usual relay emergency valve d. Air is admitted from the reservoir C to the tractor brake chambers and to the service line A under control of the usual service brake valve D, and hence the pressure in the service line A is varied to effect the operation of the brake.

When the pressure on the lines B and A is atmospheric, the spring 33' shifts the diaphragm 6 and all movable parts connected therewith so as to seat the valves 18 and 33' and cut off communication from the ports 9 and 10 to the ports 11 and 12. In this position the member 42 presses the contact 43 into engagement with the contact 45 to close the circuit and illuminate the signal to indicate that the ends of the lines A and B are closed.

When it is desired to connect the trailer braking system with the tractor braking system, the lines b and a are coupled to their respective ports 11 and 12 and the arm 38 is rocked so as to cause the pin 36 to shift the plunger 21, diaphragm 6 and movable parts connected therewith toward the right. This movement unseats the valves 18 and 33 and establishes communication between the lines A, a, and between the lines B and b. The pressure of the air communicated from the line B to the interior of the casing 1 acts on the large area of the diaphragm 6. The flange 4 contains an air vent 4' so that atmospheric pressure is maintained between the diaphragm 6 and the plunger 21. Ordinarily there is no sub-atmospheric pressure on the washer 29 of the plunger 21. When the pedal D is operated to admit air into the line A to effect the operation of the brakes, the transmission of such pressure directly to the diaphragm is prevented by the plunger 21 and washer 29 and the area of such plunger and washer is so much smaller than the area of the diaphragm 6 that any pressure transmitted to the plunger from the service line A is insufficient to shift the valve mechanism, even with the aid of the biasing spring 33'. Hence the valves 18 and 33 remain in their open position notwithstanding the variation of the pressure in the line A and chamber communicating therewith.

In the embodiment of my invention illustrated in Figs. 8 and 12 of the drawings, the tubular casing sections 1a and 2a have concave flaring flanges 3a and 4a forming a suction chamber 5a containing an elastic diaphragm 6a having its edge clamped between the abutting edges of the flanges 3a and 4a. The ends of the barrel sections of the casings are closed by plugs 7a and 8a and bosses on the bottom and side of the casings are tapped to form ports 9a and 10a, and 11a and 12a. The port 9a is connected with the atmospheric line end and port 10a is connected with the vacuum line of a conventional vacuum braking system of a tractor, and the port 11a is adapted for connection through a detachable coupling with the atmospheric line of a trailer, and the port 12a is adapted for connection through a detachable coupling with the vacuum line of a trailer having a conventional vacuum braking system.

The port 11a communicates with the interior of the casing 1a through a peripheral channel or port 15a which is controlled by valve 17a preferably having the form of a hollow plunger slidable in the cylindrical chamber of the casing 1a. The valve 17a has a stem 20a flexibly connected therewith through a ball and socket joint. The stem 20a has a bearing 22a and a shank 24a, the latter passing through the washers 23a and 25a and the diaphragm 6a. A stem 29a has a socketed end screwed onto the shank 24a and is pivotally connected with a stem 30a having a piston-like head 33a forming a valve controlling the peripheral port or channel 34a. An apertured radial guide 30b on the stem 30a operates in the casing to maintain the axial alignment of the valve 33a. A compressed coiled spring 33a' has one end seated in a recess in the plug 8a and bears against and biases leftward the valve 33a and the movable parts connected therewith.

A shaft 35a is journalled in the casing 1a and has fixed thereto an arm 36a adapted to engage the member 22a and shift the diaphragm and movable parts connected therewith toward the right against the biasing action of the spring 33a'. An arm 38a is fixed to the shaft 35a outside the casing to permit the operation of the shaft manually or through a suitable cable 40a running to the dash board or other convenient place. If desired, signalling mechanism may be operated from the shaft 35a as described in connection with the shaft 35.

The casings 1a and 2a are provided with suitable bosses or brackets 48a for attachment to a frame member 49a or a tractor.

The vacuum braking system to which my improvements are applicable is of conventional construction and operation and hence is not described in detail excepting to point out that the port 9a is connected with the atmosphere line A' of the braking system of the tractor and that the port 11a is connected through a detachable coupling and line a' with the atmosphere line of the trailer, which is connected with one side of the cylinder of a trailer brake operating mechanism. The port 10a is connected with the vacuum line B' of the tractor braking system which communicates with a usual vacuum tank, which is exhausted from the manifold of the engine and acts to exhaust air from a usual brake operating mechanism. The port 12a is connected through a detachable coupling and line b' with the vacuum tank of the trailer which exhausts air from the cylinder of the brake operating mechanism. The admission of an exhaustion of air from the lines A' and a' is controlled by the usual brake operating pedal and valve mechanism.

Having described my invention, I claim—

1. In a braking system including a pair of lines in one of which a substantially constant pressure is maintained and in the other of which pressure is varied to effect operation of brakes, a casing connected with said lines and containing chambers adapted to communicate with the respective lines, said casing containing ports through which auxiliary lines may communicate with said chambers, a fluid-pressure-operable member between said chambers, valve mechanism connected with said member, biasing means for shifting said mechanism to position for cutting off communication between said first named lines and ports, said mechanism when shifted against said biasing means permitting communication between said first named lines and the respective auxiliary-line ports and permitting communication of the pressure of one of said lines to said member and impeding communication of the pressure of the other of said lines to said member, thereby maintaining said member and mechanism against the action of said biasing means.

2. In a brake system having a plurality of lines in one of which a substantially constant pressure is maintained and in the other of which the pressure is varied in effecting the operation of the brakes, a casing connected with said lines and containing chambers adapted to communicate therewith, a diaphragm in said casing between said chambers, said casing containing ports through which auxiliary lines may communicate with said chambers, valve mechanism in said casing controlling communication between said first named lines and auxiliary line ports, means for biasing said valve mechanism toward position for preventing communication between said first named lines and auxiliary line ports, means for moving said mechanism against the action of said biasing means, said mechanism when moved against the action of said biasing means permitting communication to one side of said diaphragm of the pressure of one of said first named lines and impeding the communication to said diaphragm of the pressure of the other of said first named lines.

3. In a braking system having a plurality of lines in one of which substantially constant pressure is maintained and in the other of which the pressure is varied in effecting the operation of the brakes, a casing connected with said lines and containing chambers adapted to be placed in communication with said lines, said casing containing ports through which auxiliary lines are adapted to communicate with said chamber, a fluid-pressure-operable member, and valve mechanism controlling communication between said first named lines and said ports and providing passages through which the pressure of one of said lines may be communicated to one side of said member and including a plunger impeding the communication of pressure of the other of said lines to said member.

4. In a braking system including a plurality of pressure lines, valve mechanism for controlling said lines, means normally biasing said valve mechanism to position to close said lines, means for shifting said valves against said biasing action, and means operable by fluid pressure for maintaining said valve mechanism in its shifted positions.

5. In a braking system having a pair of main lines and a pair of auxiliary lines, means for connecting the main lines with the respective auxiliary lines and for automatically closing the main line when the auxiliary lines are disconnected, said means including a casing containing chambers connected with the main lines, valve mechanism controlling the respective lines, a diaphragm connected with the valve mechanism, and means for biasing said valve mechanism toward closing position; one of said main pressure lines communicating to one side of said diaphragm a force different than the force communicated to the other side of the diaphragm.

6. In a valve mechanism of the character described, a casing containing chambers and having ports through which said chambers may respectively communicate with constant and variable pressure lines and complementary auxiliary lines of a brake system, a fluid-pressure-operable member, valve mechanism in one of said chambers controlling communication between the main line port and auxiliary line port thereof and including a plunger impeding communication of the pressure of said chamber to said member, valve mechanism in the other of said chambers controlling communication between the main line port and auxiliary line port thereof and permitting communication to one side of said member of the pressure of said chamber when said ports are in communication, and means for normally biasing said valve mechanisms to positions for preventing communication between the main and auxiliary ports of said chambers, said member positioning said valve mechanisms.

7. In a valve mechanism of the character described, a casing containing chambers and having ports through which said chambers may respectively communicate with a substantially constant pressure line and a variable pressure line of a braking system, said casing also containing ports through which auxiliary lines may be brought into communication with said first named lines, a fluid-pressure-operable member, valve mechanism controlling communication between the main line port and auxiliary line port of one of said chambers and including a plunger impeding communication of the pressure of said chamber to one side of said member, and valve mechanism in the other of said chambers and controlling communication between the main line port and the auxiliary line port thereof and including a slide containing a passage through which the pressure of said chamber is communicated to said member when the main line port and auxiliary line port of said chamber are in communication, said member and valve mechanisms being connected with one another.

8. In a valve mechanism of the character described, a casing containing chambers having portions of substantially cylindrical cross-section, said casing having ports through which said chambers may communicate with lines of a braking system and having ports through which said first named lines may communicate with complementary lines, a fluid-pressure-operable member in said casing between said chambers, valve mechanism in one of said chambers for controlling communication between the ports thereof and including a cylindrical plunger movable in the cylindrical portion of said casing and impeding the communication to said member of the pressure of said chamber when the ports thereof are in communication, the parts of said valve mechanism being flexibly coupled, and valve mechanism in the other of said chambers controlling communication between the ports thereof and including a stem having a radial guide containing a passage through which the pressure of said chamber is communicated to one side of said member when the ports of said chamber are in communication.

9. In mechanism for controlling the pressure lines of braking systems, a casing containing a plurality of chambers, a diaphragm separating said chambers, said chambers having ports adapted for connection with pressure brake lines, valves in said chambers for controlling said pressure brake lines and connected with said diaphragm, means for biasing said valves and diaphragm in one direction, means for shifting said valves and diaphragm in the opposite direction, and a signal controlled by the position of said valves.

10. In the mechanism of the character described, a plurality of shells each having a tubular section and a concave flange, said flanges being connected together and forming a chamber, a plunger movable in the tubular section of one of said shells, a valve movable in the tubular sections of the other of said shells, means for biasing said plunger and valve, and fluid pressure mechanism for holding said plunger and valve against said biasing mechanism.

11. In mechanism for controlling the pressure lines of brake systems, a casing containing a plurality of chambers, a diaphragm between said chambers, said chambers respectively having ports adapted for connection with brake pressure lines, valves in the respective chambers for controlling ports thereof, means for biasing said valves and diaphragm in one direction, means for shifting said diaphragm in the opposite direction, said diaphragm being maintained in its last named position by the difference between the force communicated to one side of said diaphragm from one of the brake pressure lines and the force communicated to the other side of said diaphragm.

12. A control valve for a brake system having a plurality of lines in one of which the pressure is varied to effect application of the brakes and in the other of which the pressure is substantially constant, and comprising a casing containing a fluid-pressure-operable device, said casing containing chambers on opposite sides of said device and communicating with the respective brake lines, means for biasing said device, valve mechanism through which the pressure of one of said lines is communicated to said device in one position thereof, and means impeding the communication of pressure of the other of said lines to said device in the last named position thereof, each of said chambers having ports for auxiliary lines which communicate with said first named lines only in the last named position of said device.

HERBERT M. ROBINSON.